United States Patent
Marcus (10) Patent No.: US 10,273,823 B2
(45) Date of Patent: Apr. 30, 2019

(54) INLET DOOR STATE CONTROL SYSTEM

(71) Applicant: UNITED TECHNOLOGIES CORPORATION, Farmington, CT (US)

(72) Inventor: David C. Marcus, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 416 days.

(21) Appl. No.: 15/160,965

(22) Filed: May 20, 2016

(65) Prior Publication Data
US 2017/0335711 A1 Nov. 23, 2017

(51) Int. Cl.
| | |
|---|---|
| *F01D 5/02* | (2006.01) |
| *B64D 27/10* | (2006.01) |
| *B64D 33/02* | (2006.01) |
| *B64D 41/00* | (2006.01) |
| *F01D 17/12* | (2006.01) |
| *F01D 17/10* | (2006.01) |
| *F04D 29/46* | (2006.01) |
| *F04D 17/10* | (2006.01) |

(52) U.S. Cl.
CPC ............ *F01D 17/12* (2013.01); *B64D 27/10* (2013.01); *B64D 33/02* (2013.01); *B64D 41/00* (2013.01); *F01D 5/021* (2013.01); *F04D 17/10* (2013.01); *F04D 29/462* (2013.01); *B64D 2033/0213* (2013.01); *F05D 2220/50* (2013.01); *F05D 2270/3032* (2013.01); *F05D 2270/52* (2013.01)

(58) Field of Classification Search
CPC ........ F01D 17/12; F01D 17/14; F01D 17/141; F01D 17/143; F01D 17/162; F01D 17/10
USPC .......................................................... 415/17
See application file for complete search history.

(56) References Cited

U.S. PATENT DOCUMENTS

| | | | |
|---|---|---|---|
| 7,469,545 B2 | 12/2008 | Riley | |
| 2003/0183272 A1 | 10/2003 | Schnoor | |
| 2012/0006938 A1* | 1/2012 | Gatzke | B64D 41/007 244/58 |
| 2013/0074519 A1* | 3/2013 | Ertz | F02C 9/16 60/802 |

FOREIGN PATENT DOCUMENTS

| | | |
|---|---|---|
| DE | 3835667 | 4/1990 |
| EP | 1767455 | 3/2007 |

OTHER PUBLICATIONS

EP Search Report dated Oct. 19, 2017 in EP Application No. 17172082.4.

* cited by examiner

*Primary Examiner* — Justin D Seabe
*Assistant Examiner* — Jason Mikus
(74) *Attorney, Agent, or Firm* — Snell & Wilmer, L.L.P.

(57) ABSTRACT

An inlet door state control system for an auxiliary power unit (APU) includes an inlet door configured to allow air into an inlet of the APU. The system also includes an actuator configured to open the inlet door. The system also includes an APU threshold switch connected to the actuator, the APU threshold switch configured to automatically change from an open position to a closed position when a predetermined APU operating condition is met. In the system, the actuator opens the inlet door when the APU threshold switch is in the closed position.

13 Claims, 5 Drawing Sheets

INLET DOOR STATE CONTROL SYSTEM

FIELD

The present disclosure relates to auxiliary power units and, more particularly, to an inlet door state control system for an auxiliary power unit.

BACKGROUND

An auxiliary power unit (APU) on an aircraft may be a gas turbine engine configured to produce electrical and pneumatic power. The APU may provide power to start the main engines of the aircraft. The APU may also be used to power systems and devices on the aircraft, such as lights, air conditioning, and flight controls while the main engines are shut down. The APU may be connected to an inlet door, which is configured to be opened or closed and allows air to enter the APU.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

An inlet door state control system for an auxiliary power unit (APU) is disclosed. The system includes an inlet door configured to allow air into an inlet of the APU. The system also includes an actuator configured to open the inlet door. The system also includes an APU threshold switch connected to the actuator, the APU threshold switch configured to automatically change from an open position to a closed position when a predetermined APU operating condition is met. In the system, the actuator opens the inlet door when the APU threshold switch is in the closed position.

In any of the foregoing systems, the APU threshold switch moves from the open position to the closed position independent of instruction from a controller.

In any of the foregoing systems, the APU threshold switch is a thermal switch and the predetermined APU operating condition is an exhaust gas temperature, bleed air temperature, oil temperature, or fuel temperature exceeding a temperature threshold.

In any of the foregoing systems, the APU threshold switch is an air pressure switch and the predetermined APU operating condition is an air pressure within the APU exceeding an air pressure threshold.

In any of the foregoing systems, the APU threshold switch is an oil pressure switch and the predetermined APU operating condition is an oil pressure within the APU exceeding an oil pressure threshold.

In any of the foregoing systems, the APU threshold switch is a fuel pressure sensor and the predetermined APU operating condition is a fuel pressure within the APU exceeding a fuel pressure threshold.

In any of the foregoing systems, the APU threshold switch is a speed sensor and the predetermined APU operating condition is a speed of a moving part within the APU exceeding a frequency or rotation-per-minute threshold.

In any of the foregoing systems, the system further includes a door position switch connecting the actuator to the APU threshold switch, the door position switch configured to automatically change from a closed position to an open position when the inlet door is in a fully open position, thereby interrupting the actuator opening the inlet door.

An auxiliary power unit (APU) threshold switch of an APU is disclosed. The auxiliary power threshold switch is configured to initially be in an open position, interrupting activation of an actuator of the APU connected to an inlet door configured to allow air into an inlet of the APU. The auxiliary power threshold switch is also configured to automatically change from the open position to a closed position when a predetermined APU operating condition is met, activating the actuator, causing the inlet door to be opened.

In any of the foregoing auxiliary power threshold switches, the APU threshold switch automatically changes from the open position to the closed position independent of instruction from a controller.

In any of the foregoing auxiliary power threshold switches, the APU threshold switch is a thermal switch and the predetermined APU operating condition is an exhaust gas temperature, bleed air temperature, oil temperature, or fuel temperature exceeding a temperature threshold.

In any of the foregoing auxiliary power threshold switches, the APU threshold switch is an air pressure switch and the predetermined APU operating condition is an air pressure within the APU exceeding an air pressure threshold.

In any of the foregoing auxiliary power threshold switches, the APU threshold switch is an oil pressure switch and the predetermined APU operating condition is an oil pressure within the APU exceeding an oil pressure threshold.

In any of the foregoing auxiliary power threshold switches, the APU threshold switch is a fuel pressure sensor and the predetermined APU operating condition is a fuel pressure within the APU exceeding a fuel pressure threshold.

In any of the foregoing auxiliary power threshold switches, the APU threshold switch is a speed sensor and the predetermined APU operating condition is a speed of a moving part within the APU exceeding a frequency or rotation-per-minute threshold.

An inlet door state control system for an auxiliary power unit (APU) is disclosed. The system includes an inlet door configured to allow air into an inlet of the APU. The system also includes an actuator configured to open the inlet door. The system also includes a first APU threshold switch connected to the actuator, the first APU threshold switch configured to automatically change from an open position to a closed position when a first threshold is exceeded, thereby opening the inlet door. The system also includes a first inlet door state switch connected to the first APU threshold switch, the first inlet door state switch configured to automatically change from a closed position to an open position when a first inlet door state is reached, thereby ceasing further opening of the inlet door.

In any of the foregoing systems, the first APU threshold switch moves from the open position to the closed position independent of instruction from a controller.

In any of the foregoing systems, the first inlet door state switch moves from the closed position to the open position independent of instruction from a controller.

In any of the foregoing systems, the system further includes a second APU threshold switch and a second inlet door state switch. In those particular systems, the first APU threshold switch and the first inlet door state switch are connected in series, the second APU threshold switch and the second inlet door state switch are connected in series, and the first APU threshold switch and the first inlet door state switch are connected in parallel to the second APU threshold switch and the second inlet door state switch.

In any of the foregoing systems, the second APU threshold switch is configured to automatically change from an open position to a closed position when a second threshold is exceeded, and the second inlet door state switch is configured to automatically change from a closed position to an open position when a second inlet door state is reached. In those particular systems, the second threshold is greater than the first threshold, and the inlet door is more open in the second inlet door state than in the first inlet door state.

In any of the foregoing systems, the second APU threshold switch moves from the open position to the closed position independent of instruction from a controller.

In any of the foregoing systems, the second inlet door state switch moves from the closed position to the open position independent of instruction from a controller.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Surface shading lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Figure 1:
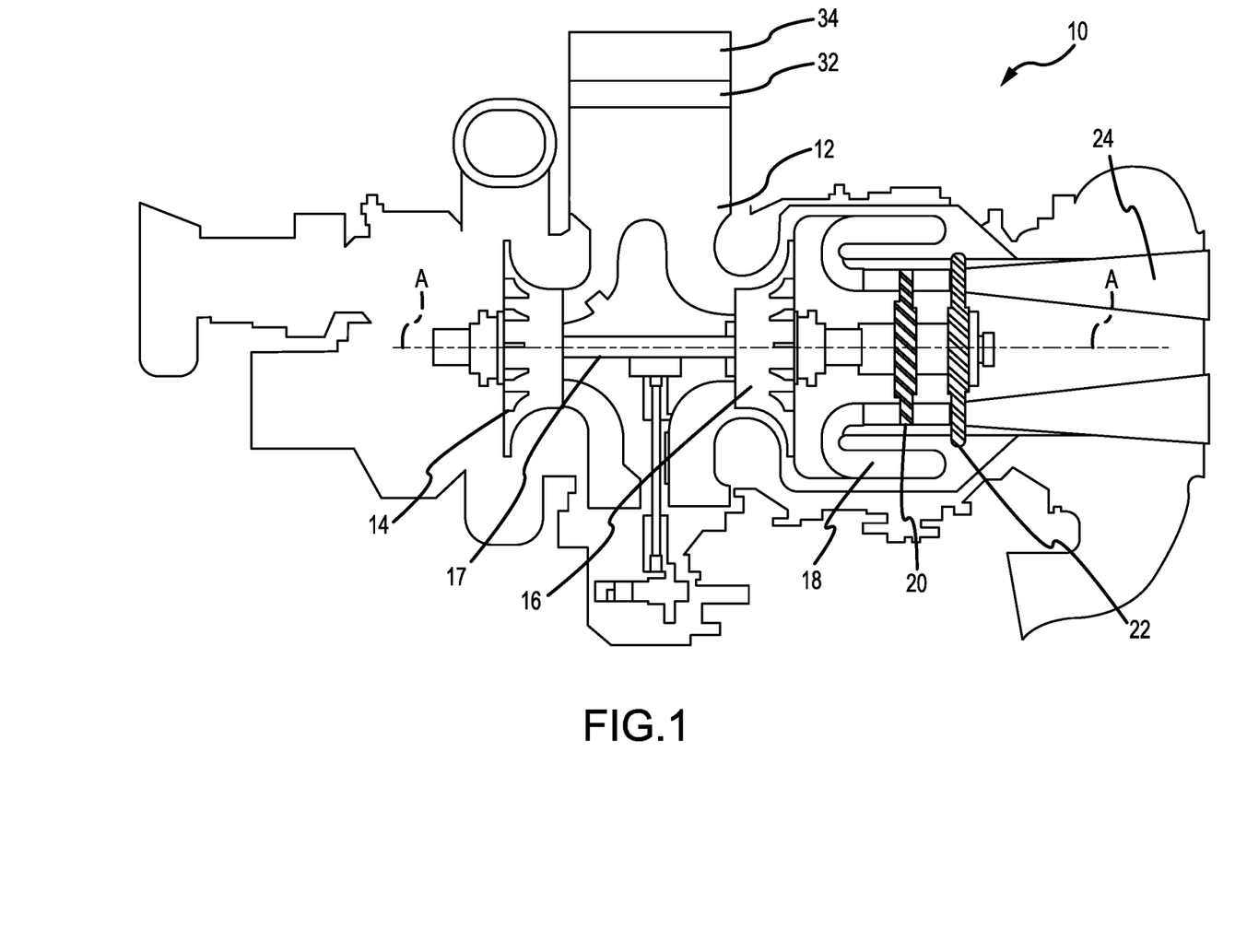
FIG. 1 is a schematic cross-section of an auxiliary power unit.

With reference to FIG. 1, an exemplary APU is shown, in accordance with various embodiments. APU 10 may include a centrifugal compressor 16 for pressurizing incoming air from inlet 12. Air may enter APU 10 through inlet door 34 controlled by actuator 32. A combustor 18 may be disposed aft of centrifugal compressor 16. The compressed air may be mixed with fuel and ignited in the combustor 18, generating an annular stream of hot combustion gases moving towards exhaust duct 24. A turbine 20 and turbine 22 may be aft of the combustor 18 and is also mechanically coupled to centrifugal compressor 16 through a shaft. Turbine 20 and turbine 22 may extract energy from the combusted gases exiting the combustor 18. In various embodiments, turbine 20 is a compressor turbine and turbine 22 is a power turbine. In various embodiments, turbine 20 is a first power turbine and turbine 22 is a second power turbine. In various embodiments, one or more of the previous components may not be present.

Various components of APU 10 may rotate about an axis of rotation A. The centrifugal compressor 16 may direct compressed air towards the combustor 18. The forward and aft positions of APU 10 may be described relatively along axis of rotation A. For example, load compressor 14 may be referred to as forward of turbine 20 and turbine 20 may be referred to as aft of load compressor 14. As air flows from centrifugal compressor 16 to the more aft components of APU 10, axis of rotation A may also generally define the net direction of the air stream flow. However, the direction of the air stream flow may vary through the individual components. For example, the air flow may be radial in portion of centrifugal compressor 16.

An amount of air entering inlet 12 may be modulated by the actuator 32 controlling the inlet door 34. The wider the inlet door 34 is open, the more air may enter inlet 12 and eventually into the APU 10.

The inlet door 34 may be configured to have one of three states: fully closed, partially open, or fully open. The fully closed state may be used when the APU 10 is not being used, either during a flight or when the aircraft is being unused. The partially open state or the fully open state may be used for the initial APU 10 light-off conditions during the start sequence of the aircraft. The partially open state may correspond to any amount of openness between closed and fully open, such as 20% open, 30% open, or 50% open. The fully open state may correspond to 100% open and the fully closed state may correspond to 0% open. As used herein, the inlet door 34 includes a covering and an opening to the inlet 12, such that when the inlet door 34 is referred to as being "open" or "closed," the reference is with respect to a size of the opening covered by the door.

Use of the partially open state may be based on a condition of the APU 10 or any of the components therein. The inlet door 34 may be configured to the partially open state when a predetermined APU operating condition associated with the partially open state is met. The predetermined APU operating condition associated with the partially open state may be an output of the APU 10 being between a lower start threshold and an upper start threshold. For example, the lower start threshold may be 0% of the maximum APU speed, and the upper start threshold may be 10% of the maximum APU speed. The inlet door 34 may be configured to be in the fully open state in response to a predetermined APU operating condition associated with the fully open state being met. The predetermined APU operating condition associated with the fully open state may be an APU speed exceeding an APU speed threshold, such as 90% of the maximum APU speed.

When the inlet door 34 is capable of three states, the inlet door 34 may be set to the partially open state until the predetermined APU operating condition associated with the fully open state is met. In various embodiments, the inlet door 34 may be capable of any number of intermediate states between closed and fully open. When the inlet door 34 is capable of intermediate states, each intermediate state may be associated with a corresponding predetermined APU operating condition. For example, the inlet door 34 may be capable of a closed state, a first partially open state, a second partially open state, a third partially open state, and a fully open state. The first partially open state may correspond to the inlet door 34 being 25% open; the second partially open state may correspond to the inlet door 34 being 50% open; the third partially open state may correspond to the inlet door 34 being 75% open; and the fully open state may correspond to the inlet door 34 being 100% open. In addition, each state may correspond to a predetermined APU operating condition. For example, the first partially open state may correspond to a first open condition. The first open condition may be an exhaust temperature, bleed air temperature, oil temperature, or fuel temperature exceeding a first threshold. The second partially open state may correspond to a second open condition. The second condition may be an exhaust temperature, bleed air temperature, oil temperature, or fuel temperature exceeding a second threshold.

Figure 2:
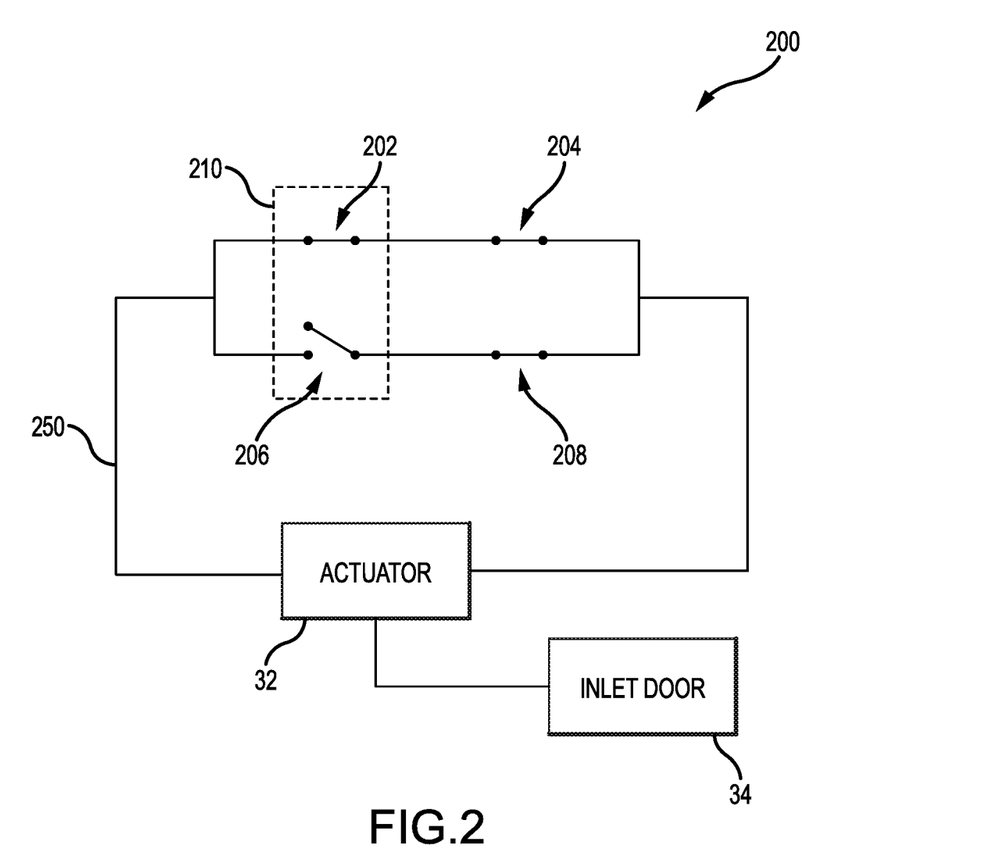
FIG. 2 is a diagram of an inlet door state control system of an auxiliary power unit.

With reference to FIG. 2, a block diagram of an inlet door state control system is shown. Inlet door state control system 200 includes an actuator 32, an inlet door 34, a partially-open-state command switch 202, a partially-open-state detecting switch 204, a fully-open-state command switch 206, a fully-open-state detecting switch 208, and an APU controller 210.

The actuator 32 may be any kind of actuator capable of moving or controlling a mechanism or object. In this case, the actuator 32 is configured to move and control the opening of the inlet door 34. The actuator 32 may be powered by a power supply. The power supply may be on the same electrical circuit and any switches, with the switches being sufficiently robust to withstand the cycles of high power on and off through the circuit. The power supply may be separated from the circuit, but connected by relays that open and close both sides of the circuit based on conditions of any of the switches.

The partially-open-state command switch 202 and the fully-open-state command switch 206 may be controlled by APU controller 210. APU controller 210 may be a processing unit configured to control functions and operation of the APU 10, including inlet door operation.

Partially-open-state detecting switch 204 and fully-open-state detecting switch 208 may include sensors that, in response to being triggered, mechanically open the partially-open-state detecting switch 204 and the fully-open-state detecting switch 208, from a closed position. Partially-open-state detecting switch 204 and fully-open-state detecting switch 208 may be microswitches.

In operation, initially, the partially-open-state command switch 202 and the fully-open-state command switch 206 are each set to the open position. In addition, the partially-open-state detecting switch 204 and the fully-open-state detecting switch 208 are each set to the closed position.

The APU controller 210 instructs the partially-open-state command switch 202 to close. The APU controller 210 may instruct the partially-open-state command switch 202 to close in response to a corresponding condition being met, such as the aircraft initial startup sequence being activated. As a result, the partially-open-state command switch 202 and the partially-open-state detecting switch 204 are both closed. When the partially-open-state command switch 202 and the partially-open-state detecting switch 204 are both closed, circuit 250 is completed and the actuator 32 is activated, causing inlet door 34 to be opened.

As described herein, the partially open state may correspond with a percentage of openness of the inlet door 34. The partially-open-state detecting switch 204 may detect that the corresponding percentage of openness of the inlet door 34 is reached and the partially-open-state detecting switch 204 may be opened, causing the circuit 250 to be broken and thereby causing the actuator 32 to cease opening of inlet door 34.

The APU controller 210 instructs the fully-open-state command switch 206 to close. The APU controller 210 may instruct the fully-open-state command switch 206 to close in response to a corresponding condition being met, such as a predetermined time after initial APU start. When the fully-open-state command switch 206 and the fully-open-state detecting switch 208 are both closed, circuit 250 is completed and the actuator 32 is again activated, causing inlet door 34 to be further opened.

The fully-open-state detecting switch 208 may detect that the inlet door 34 has reached a fully open state, and the fully-open-state detecting switch 208 may be opened, causing circuit 250 to be broken and thereby causing the actuator 32 to cease opening of inlet door 34.

Partially-open-state command switch 202 and fully-open-state command switch 206 may be mechanical switches opened and closed by an individual, or may be controlled by APU controller 210, as described herein. While the inlet door state control system 200 of FIG. 2 may modulate the opening of inlet door 34, transitioning from a partially open state to a fully open state may be triggered by either an individual or by a controller.

Figure 3:
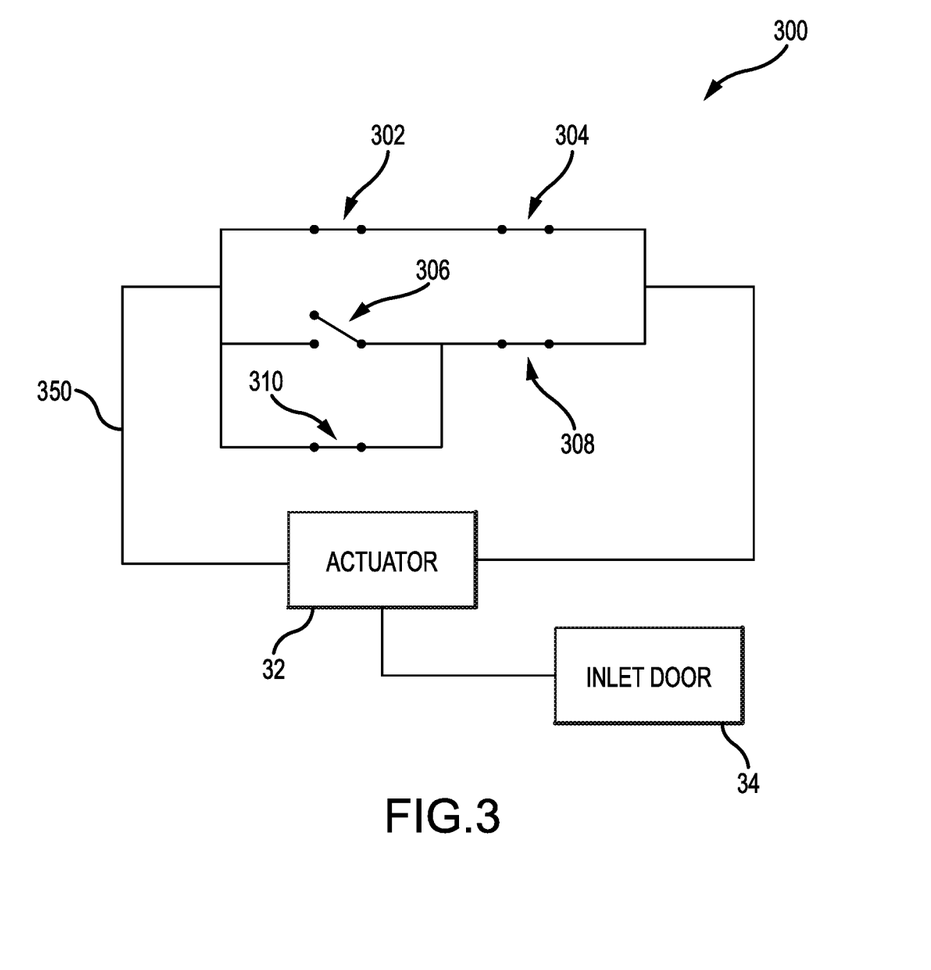
FIG. 3 is a diagram of an inlet door state control system of an auxiliary power unit with an APU threshold switch.

FIG. 3 illustrates an inlet door state control system 300 capable of transitioning from a partially open state to a fully open state without triggering by an individual or by a controller. Inlet door state control system 300 includes a partially-open-state command switch 302, a partially-open-state detecting switch 304, a fully-open-state command switch 306, a fully-open-state detecting switch 308, an actuator 32, and an inlet door 34. These elements are similar to corresponding elements of inlet door state control system 200 of FIG. 2. They are numbered similarly and have similar functionality. Inlet door state control system 300 also includes APU threshold switch 310.

APU threshold switch 310 is a switch that is configured to automatically change to a closed position in response to an APU operating condition being met, thereby closing the circuit 350 and causing actuator 32 to open inlet door 34. The APU operating condition may be associated with the APU 10, such as a temperature within the APU 10 (e.g., exhaust gas temperature, bleed air temperature, oil temperature, or fuel temperature) an air pressure of the APU 10, an oil pressure of the APU 10, a fuel pressure of the APU 10, or a speed of the APU 10. The APU operating condition may be established as an indicator of APU 10 operating speed.

In an exemplary operation, APU threshold switch 310 is initially in an open position and the fully-open-state detecting switch 308 is initially in a closed position. The partially-open-state command switch 302 and the fully-open-state command switch 306 may initially be in an open position, and the partially-open-state detecting switch 304 may be in a closed position.

During operation of the APU 10, the APU threshold switch 310 may change to a closed position when an APU operating condition is met. The APU operating condition may be an exhaust temperature threshold and the APU threshold switch 310 may be a thermal switch configured to close in response to the exhaust temperature, bleed air temperature, oil temperature, or fuel temperature threshold being exceeded. The APU operating condition may be an air pressure threshold and the APU threshold switch 310 may be a pressure switch configured to close when the air pressure threshold is exceeded. The APU operating condition may be an oil pressure threshold or a fuel pressure threshold and the APU threshold switch 310 may be a fluid pressure switch configured to close when the oil pressure threshold or the fuel pressure threshold are exceeded. The APU operating condition may be a speed threshold and the APU threshold switch 310 may be a speed sensor configured to close when a speed of a moving part within the APU 10 exceeds a frequency or rotations-per-minute threshold. When the APU threshold switch 310 is closed and the fully-open-state detecting switch 308 is closed, circuit 350 is completed, causing the actuator 32 to open inlet door 34. As described herein, when the inlet door 34 reaches a fully open state, the fully-open-state detecting switch 308 is configured to automatically change to an open position, causing the circuit 350 to be broken, thereby ceasing the actuator's 32 opening of inlet door 34.

In this way, APU threshold switch 310 is configured to automatically cause a mechanical opening of inlet door 34 independent of a command or indication from an individual or a controller. As a result, a response time of opening of inlet door 34 by actuator 32 is reduced, as signal processing by a controller is obviated. By providing for a mechanism to further open the inlet door 34 before the fully open state of the inlet door 34 is reached, sufficient air may be provided to the APU 10 for operation. In various embodiments, when the inlet door 34 is not sufficiently opened, pressure may build within the APU 10. In various embodiments, when the inlet door 34 is opened too much, an excess of air may interfere with combustion. Accordingly, providing an appropriate amount of air by modulating the inlet door 34 may result in improved APU 10 performance.

FIGS. 4A-F illustrate an inlet door state control system 400 capable of opening the inlet door 34 without triggering or instruction by an individual or by a controller. Inlet door state control system 400 includes a first APU threshold switch 402, a first inlet door state switch 404, a second APU threshold switch 406, a second inlet door state switch 408, a third APU threshold switch 410, a third inlet door state switch 412, a fourth APU threshold switch 414, and a fourth inlet door state switch 416. As shown in FIGS. 4A-4F, the first APU threshold switch 402 and the first inlet door state switch 404 are connected in series, the second APU threshold switch 406 and the second inlet door state switch 408 are connected in series, the third APU threshold switch 410 and the third inlet door state switch 412 are connected in series, and the fourth APU threshold switch 414 and the fourth inlet door state switch 416 are connected in series. As shown in FIGS. 4A-4F, the first APU threshold switch 402 and the first inlet door state switch 404 are connected in parallel to the second APU threshold switch 406 and the second inlet door state switch 408, which are connected in parallel to the third APU threshold switch 410 and the third inlet door state switch 412, which are connected in parallel to the fourth APU threshold switch 414 and the fourth inlet door state switch 416.

Each APU threshold switch 402, 406, 410, and 414 is initially configured to be in an open position, and is configured to automatically switch to a closed position when a respective threshold is exceeded. As described herein, the thresholds associated with the APU threshold switches 402, 406, 410, and 414 may be associated with a predetermined APU operating condition, such as exhaust gas temperature, bleed air temperature, oil temperature, fuel temperature, air pressure, oil pressure, fuel pressure, or speed. Each inlet door state switch 404, 408, 412, and 416 is initially configured to be in a closed position, and is configured to automatically switch to an open position when a respective inlet door state is reached.

Figure 4A:
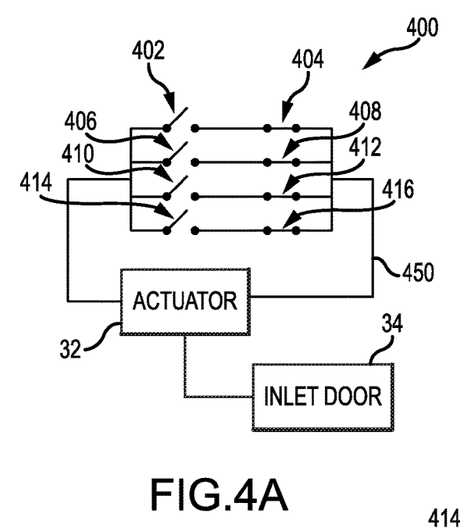
FIGS. 4A, 4B, 4C, 4D, 4E and 4F are diagrams of an inlet door state control system with multiple APU threshold switches and multiple inlet door state switches.

As shown in FIG. 4A, each of the APU threshold switches 402, 406, 410, and 414 are in the open position, and each of the inlet door state switches 404, 408, 412, and 416 are in the closed position. As such, the actuator 32 does not open inlet door 34, as the circuit 450 is not complete. The APU 10 may begin operation.

Figure 4B:
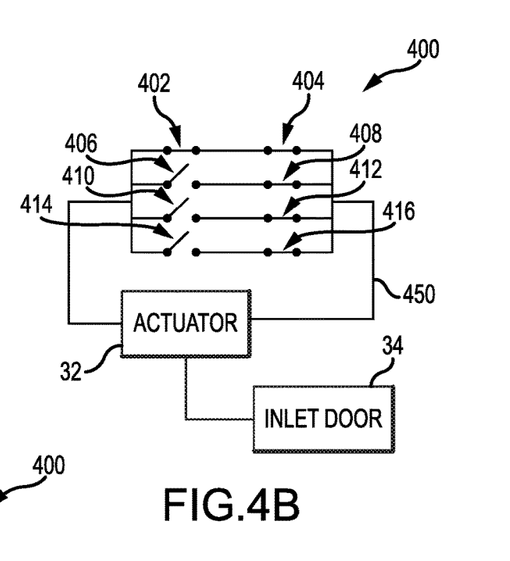

As shown in FIG. 4B, the first APU threshold switch 402 is in a closed position. During operation of the APU 10, the first threshold associated with the first APU threshold switch 402 may have been exceeded and therefore the first APU threshold switch 402 automatically closed. Also as shown in FIG. 4B, the first inlet door state switch 404 is also in a closed position. The inlet door state associated with the first inlet door state switch 404 may not have been reached. The actuator 32 is gradually opening inlet door 34, as the circuit 450 is complete.

Figure 4C:
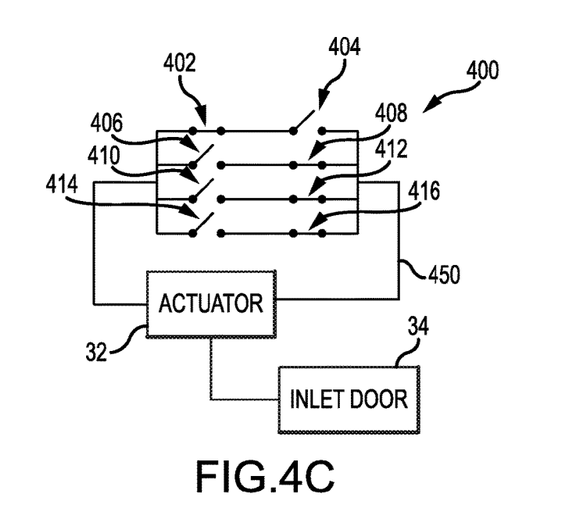

As shown in FIG. 4C, the inlet door 34 reached the inlet door state associated with the first inlet door state switch 404, and accordingly the first inlet door state switch 404 automatically changed from the closed position as shown in FIG. 4B, to the open position as shown in FIG. 4C.

Figures 4D, 4E, 4F:
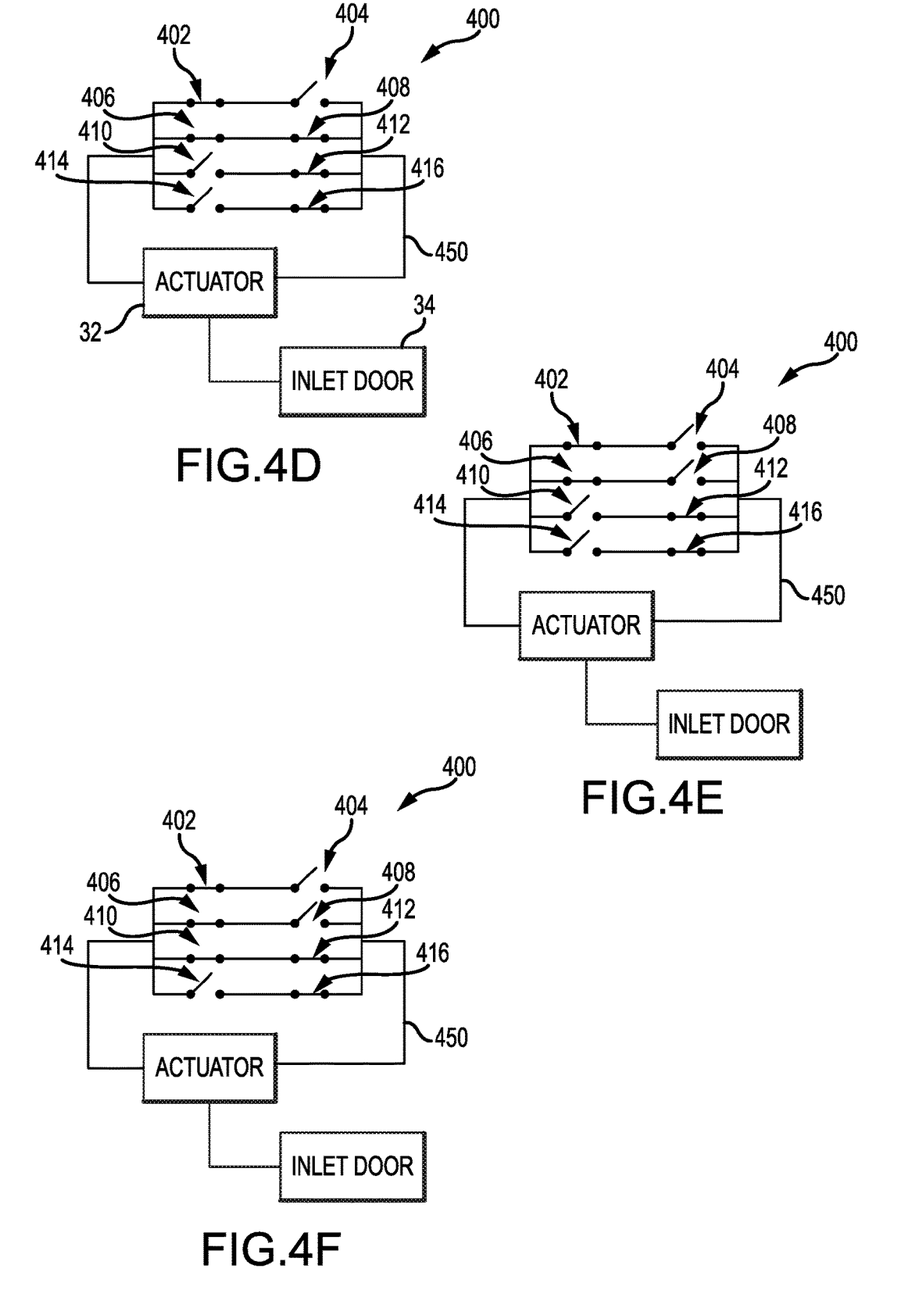

Operation of the APU 10 may continue and a second threshold may be reached. As shown in FIG. 4D, the second APU threshold switch 406 automatically changed from the open position to the closed position. As a result, circuit 450 is complete and the actuator 32 resumes gradually opening inlet door 34. In various embodiments, the inlet door 34 is in a more open state in FIG. 4D than in FIG. 4B.

Operation of the APU 10 continues, as shown in FIG. 4E, with the second inlet door state switch being automatically changed to an open position, thereby interrupting circuit 450. Operation of the APU 10 further continues, as shown in FIG. 4F, with the third APU threshold switch 410 automatically being in a closed position, as a third threshold has been reached. Accordingly, actuator 32 resumes opening of inlet door 34.

While varying numbers of switches have been illustrated, any number and combination of APU threshold switches and inlet door state switches may be used to modulate the opening of inlet door 34 using actuator 32. In addition, protective switches in series with the circuit (e.g., circuits 250, 350, 450) may be present. These protective switches may open the circuit based on actuator 32 or inlet door 34 conditions, such as overheating, to protect the actuator 32 or the inlet door 34. In addition, there may be multiple switches where a single switch is shown and described herein, to provide for redundancies to account for the life of each switch.

While opening of the inlet door 34 is shown and described herein, the same systems may be used for closing the inlet door 34, with partially open states as described herein viewed as partially closed states and fully open states as described herein viewed as fully closed states. For example, returning to FIG. 3, the partially-open-state command switch 302, the partially-open-state detecting switch 304, the fully-open-state command switch 306, and the fully-open-state detecting switch 308 may be viewed as a partially-closed-state command switch 302, a partially-closed-state detecting switch 304, a fully-closed-state command switch 306, and a fully-closed-state detecting switch 308 for transitioning from an open state to a closed state without triggering by an individual or by a controller. Accordingly, the APU threshold switch 310 may be configured to automatically cause a mechanical closing of inlet door 34 independent of a command or indication from an individual or a controller.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inlet door state control system for an auxiliary power unit (APU), comprising:
    an inlet door configured to allow air into an inlet of the APU;
    an actuator configured to open the inlet door;
    a plurality of parallel-connected APU threshold switches connected in series to the actuator, the plurality of parallel-connected APU threshold switches configured to change from an open position to a closed position in response to a predetermined APU operating condition being satisfied, and
    a plurality of parallel-connected door state switches connecting the actuator in series to the plurality of parallel-connected APU threshold switches, the plurality of parallel-connected door state switches configured to automatically change from a closed position to an open position in response to the inlet door being in a fully open position, thereby interrupting the actuator from opening the inlet door,
    wherein the actuator opens the inlet door in response to any one of the plurality of parallel-connected APU threshold switches and corresponding plurality of parallel-connected door state switches being in the closed position.

2. The inlet door state control system of claim 1, wherein the APU threshold switches move from the open position to the closed position independent of instruction from a controller.

3. The inlet door state control system of claim 1, wherein at least one of the plurality of parallel-connected APU threshold switches is a thermal switch and the predetermined APU operating condition is at least one an exhaust gas temperature, bleed air temperature, oil temperature, and fuel temperature, each exceeding a temperature threshold.

4. The inlet door state control system of claim 1, wherein at least one of the plurality of parallel-connected APU threshold switches is an air pressure switch and the predetermined APU operating condition is an air pressure within the APU exceeding an air pressure threshold.

5. The inlet door state control system of claim 1, wherein at least one of the plurality of parallel-connected APU threshold switches is an oil pressure switch and the predetermined APU operating condition is an oil pressure within the APU exceeding an oil pressure threshold.

6. The inlet door state control system of claim 1, wherein at least one of the APU threshold switches is a fuel pressure sensor and the predetermined APU operating condition is a fuel pressure within the APU exceeding a fuel pressure threshold.

7. The inlet door state control system of claim 1, wherein at least one of the APU threshold switches is a speed sensor and the predetermined APU operating condition is a speed within the APU exceeding a frequency or rotation-per-minute threshold.

8. The inlet door state control system of claim 1, further comprising a door position switch connecting the actuator to at least one of the APU threshold switches, the door position switch configured to automatically change from a closed position to an open position in response to the inlet door being in a fully open position, thereby interrupting the actuator opening the inlet door.

9. An inlet door state control system for an auxiliary power unit (APU), comprising:
   an inlet door configured to allow air into an inlet of the APU;
   an actuator configured to open the inlet door;
   a first APU threshold switch connected to the actuator, the first APU threshold switch configured to change from a first open position to a first closed position in response to exceeding a first threshold, thereby opening the inlet door; and
   a first inlet door state switch connected to the first APU threshold switch, the first inlet door state switch configured to change from a second closed position to a second open position in response to reaching a first inlet door state, thereby ceasing further opening of the inlet door,
   wherein the actuator opens the inlet door in response to at least one of the first APU threshold switch being in the first closed position and the first inlet door state switch being in the second closed position.

10. The inlet door state control system of claim 9, further comprising a second APU threshold switch and a second inlet door state switch,
   wherein the first APU threshold switch and the first inlet door state switch are connected in series, the second APU threshold switch and the second inlet door state switch are connected in series, and the first APU threshold switch and the first inlet door state switch are connected in parallel to the second APU threshold switch and the second inlet door state switch.

11. The inlet door state control system of claim 10, wherein the second APU threshold switch is configured to automatically change from a third open position to a third closed position when a second threshold is exceeded, and the second inlet door state switch is configured to automatically change from a fourth closed position to fourth open position in response to reaching a second inlet door state, and
   wherein the second threshold is greater than the first threshold, and the inlet door is more open in the second inlet door state than in the first inlet door state.

12. The inlet door state control system of claim 11, wherein at least one of the first APU threshold switch is configured to move from the first open position to the first closed position and the second APU threshold switch is configured to move from the third open position to the third closed position, both independent of instruction from a controller.

13. The inlet door state control system of claim 11, wherein at least one of the first inlet door state switch is configured to move from the second open position to the second closed position and the second inlet door state switch is configured to move from the fourth closed position to the fourth open position, both independent of instruction from a controller.

* * * * *